(12) United States Patent
Atsumi et al.

(10) Patent No.: US 11,001,308 B2
(45) Date of Patent: May 11, 2021

(54) VEHICLE FRONT STRUCTURE

(71) Applicant: TOYOTA JIDOSHA KABUSHIKI KAISHA, Aichi-ken (JP)

(72) Inventors: Hyuga Atsumi, Nagoya (JP); Shigenori Hashida, Toyota (JP); Kentaro Nakamura, Toyota (JP)

(73) Assignee: TOYOTA JIDOSHA KABUSHIKI KAISHA

( * ) Notice: Subject to any disclaimer, the term of this patent is extended or adjusted under 35 U.S.C. 154(b) by 88 days.

(21) Appl. No.: 16/420,170

(22) Filed: May 23, 2019

(65) Prior Publication Data

US 2020/0047696 A1 Feb. 13, 2020

(30) Foreign Application Priority Data

Aug. 7, 2018 (JP) .............................. JP2018-148343

(51) Int. Cl.
| | | |
|---|---|---|
| B62D 25/08 | (2006.01) | |
| B60R 19/34 | (2006.01) | |
| B60R 19/12 | (2006.01) | |
| B60R 19/18 | (2006.01) | |

(52) U.S. Cl.
CPC .............. *B62D 25/08* (2013.01); *B60R 19/12* (2013.01); *B60R 19/18* (2013.01); *B60R 19/34* (2013.01); *B62D 25/084* (2013.01); *B60R 2019/1806* (2013.01)

(58) Field of Classification Search
CPC ....... B60R 19/34; B62R 21/02; B62R 21/152; B62R 25/08
USPC ............ 296/203.01, 203.02, 193.09, 187.09, 296/187.1
See application file for complete search history.

(56) References Cited

U.S. PATENT DOCUMENTS

| | | | | |
|---|---|---|---|---|
| 5,123,695 | A * | 6/1992 | Kanemitsu ........... | B62D 25/084 296/193.09 |
| 9,643,651 | B2 * | 5/2017 | Dressel ................. | B62D 21/11 |
| 2013/0320710 | A1 * | 12/2013 | Watanabe ............ | B62D 21/152 296/187.09 |
| 2015/0069785 | A1 | 3/2015 | Sakakibara et al. | |

(Continued)

FOREIGN PATENT DOCUMENTS

| | | |
|---|---|---|
| EP | 1580097 A2 | 9/2005 |
| EP | 2982574 A1 | 2/2016 |

(Continued)

OTHER PUBLICATIONS

Unpublished U.S. Appl. No. 16/528,999, filed Aug. 1, 2019, 35pp.

*Primary Examiner* — Dennis H Pedder
(74) *Attorney, Agent, or Firm* — Hauptman Ham, LLP

(57) ABSTRACT

A vehicle front structure includes a first bumper reinforcement, a pair of right and left front side members respectively disposed on a vehicle rear side of outer portions of the first bumper reinforcement in a vehicle width direction, an apron upper member, a first crash box interposed between the first bumper reinforcement and the front side member, a cross member coupling together front ends of the pair of right and left front side members in the vehicle width direction, and a high-voltage component disposed on the vehicle rear side of and at a distance from the cross member. The first crash box is configured to undergo compressive deformation when a load equal to or larger than a predetermined value is input from the first bumper reinforcement.

14 Claims, 5 Drawing Sheets

(56) References Cited

U.S. PATENT DOCUMENTS

2015/0360632 A1  12/2015 Nishida et al.
2016/0236718 A1* 8/2016 Tatsuwaki ............ B62D 21/155
2019/0351750 A1* 11/2019 Caliskan ................ B62D 21/02

FOREIGN PATENT DOCUMENTS

| JP | H7-156663 A | 6/1995 |
| JP | 2011-20627 A | 2/2011 |
| JP | 2015-54589 A | 3/2015 |
| JP | 2016150685 A | 8/2016 |
| JP | WO2014115580 A1 | 1/2017 |
| KR | 101490648 B1 | 2/2015 |
| WO | 2010133934 A1 | 11/2010 |

* cited by examiner

VEHICLE FRONT STRUCTURE

INCORPORATION BY REFERENCE

The disclosure of Japanese Patent Application No. 2018-148343 filed on Aug. 7, 2018 including the specification, drawings and abstract is incorporated herein by reference in its entirety.

BACKGROUND

1. Technical Field

The present disclosure relates to a vehicle front structure.

2. Description of Related Art

Various vehicle front structures for automobiles are known (see Japanese Patent Application Publications No. 2011-20627 (JP 2011-20627 A), No. 7-156663, and No. 2015-54589). For example, JP 2011-20627 A discloses a structure in which a motor compartment is provided in a vehicle body front part of an electric vehicle and a motor and other components are disposed in this motor compartment.

SUMMARY

One of the differences between an electric vehicle and a vehicle having only an engine as a driving source (so-called conventional vehicle) is the size of components installed in the vehicle body front part. It is therefore desirable that a framework structure in the vehicle body front part be adapted for an electric vehicle so as to be able to effectively respond to a frontal collision.

The present disclosure improves the crashworthiness of an electric vehicle in a frontal collision.

An aspect of the present disclosure is a vehicle front structure. This vehicle front structure includes a first bumper reinforcement, a pair of right and left front side members, an apron upper member, a first crash box, a cross member, and a high-voltage component. The first bumper reinforcement is disposed on a front-end side of a vehicle body front part, with a longitudinal direction oriented in a vehicle width direction. The pair of right and left front side members are respectively disposed on a vehicle rear side of outer portions of the first bumper reinforcement in the vehicle width direction. The pair of right and left front side members are provided so as to incline outward in the vehicle width direction while extending toward a vehicle front side. The apron upper member has an elongated shape, and a rear part of the apron upper member is located on an outer side in the vehicle width direction as well as a vehicle upper side of the front side member and extends along a vehicle front-rear direction. A front lower end of the apron upper member is connected to a front-end side of the front side member. The first crash box is interposed between the first bumper reinforcement and the front side member. The first crash box is configured to undergo compressive deformation when a load equal to or larger than a predetermined value is input from the first bumper reinforcement. The cross member couples together front ends of the pair of right and left front side members in the vehicle width direction. The high-voltage component is disposed on the vehicle rear side of and at a distance from the cross member.

In the above configuration, the pair of right and left front side members incline outward in the vehicle width direction while extending toward the vehicle front side, and the crash box is interposed between the front side member and the bumper reinforcement. Thus, when a collision load is input into an end in the vehicle width direction of the bumper reinforcement, this collision load is transferred to the front side member through the crash box. The crash box undergoes compressive deformation in the process, thereby absorbing a predetermined amount of energy. Since the front lower end of the apron upper member is connected on the front-end side of the front side member, part of the collision load transferred from the bumper reinforcement to the front side member through the crash box is transferred to the apron upper member.

In the above configuration, the front ends of the pair of right and left front side members are coupled together in the vehicle width direction by the cross member. Thus, when a collision load is input into an end in the vehicle width direction of the bumper reinforcement and transferred to the front side member through the crash box, the cross member acting as a strut restrains the bending of the front side member. As a result, the front side member stably undergoes axial compressive deformation and efficiently absorbs energy. Moreover, since the high-voltage component is disposed on the vehicle rear side of and at a distance from the cross member, in a frontal collision of the vehicle, the front side member can undergo axial compressive deformation without the cross member coming into contact with the high-voltage component according to the separation distance, and can thereby reduce the load on the dashboard panel.

In the above vehicle front structure, the first crash box may have a larger width outward in the vehicle width direction than the front end of the front side member.

The above configuration allows for a large amount of overlap between a colliding body and the crash box in the vehicle width direction when the colliding body collides with the vehicle in a direction from the vehicle front side toward an end in the vehicle width direction of the bumper reinforcement. Accordingly, when a colliding body collides as above, the crash box and the front side member can undergo compressive deformation more appropriately.

The above vehicle front structure may further include a suspension member on which the high-voltage component is installed and which includes a pair of right and left side extension parts extending along the vehicle front-rear direction. Each of the pair of right and left side extension parts may have a front end located on the outer side of the front side member in the vehicle width direction and a rear-side portion located on an inner side of the front side member in the vehicle width direction.

The above configuration makes it easy to place the suspension member so as not to interfere with a tire envelope.

The above vehicle front structure may further include a second bumper reinforcement disposed on a vehicle lower side of the first bumper reinforcement, with a longitudinal direction oriented in the vehicle width direction, and a second crash box interposed between the side extension part and the second bumper reinforcement, on the vehicle lower side of the first crash box. The second crash box may be configured to undergo compressive deformation when a load equal to or larger than a predetermined value is input from the second bumper reinforcement. The high-voltage component may be disposed on the vehicle rear side of an intersection between the side extension part and the front side member as seen in a vehicle plan view.

In the above configuration, when a collision load is input into an end in the vehicle width direction of the second bumper reinforcement, this collision load is transmitted to the side extension part of the suspension member through the second crash box. The second crash box undergoes compressive deformation in the process, thereby absorbing a predetermined amount of energy. Thus, when a colliding body collides with an end side in the vehicle width direction of a vehicle front surface, a predetermined amount of energy can be absorbed by the second crash box in addition to the first crash box.

The high-voltage component is disposed on the vehicle rear side of the intersection between the side extension part and the front side member as seen in a vehicle plan view. Thus, when a colliding body collides with an end side in the vehicle width direction of the vehicle front surface, the first crash box and the second crash box can undergo compressive deformation, and moreover the front side member can undergo a predetermined amount of compressive deformation without the colliding body receiving a reaction force from the high-voltage component.

In the above vehicle front structure, the second crash box may be provided so as to overlap the entire first crash box as seen in the vehicle plan view.

In the above configuration, when a colliding body collides with an end side in the vehicle width direction of the vehicle front surface, the second crash box can more stably absorb energy in conjunction with the first crash box.

The above vehicle front structure may further include a coupling member that couples together the front side member, the apron upper member, the first crash box, and the cross member. The coupling member may include a first tubular part that opens toward the vehicle rear side and is joined to the front side member, with the front end side of the front side member being inserted into the first tubular part, a second tubular part that opens toward the vehicle upper side and is joined to the apron upper member, with the front lower end side of the apron upper member being inserted into the second tubular part, a third tubular part that opens toward the vehicle front side and is joined to the first crash box, with a rear end side of the first crash box being inserted into the third tubular part, and a fourth tubular part that opens toward an inner side in the vehicle width direction and is joined to the cross member, with an outer end side of the cross member in the vehicle width direction being inserted into the fourth tubular part.

In the above configuration, the front side member, the apron upper member, the crash box, and the cross member are firmly coupled together through the coupling member. When a collision load is transmitted from the bumper reinforcement to the front side member through the crash box, the bending of the front side member is appropriately restrained, and part of the collision load is appropriately transmitted to the apron upper member.

In the above vehicle front structure, an inner edge in the vehicle width direction of a rear end of the first crash box may be provided at a same position in the vehicle width direction as an inner edge in the vehicle width direction of the front end of the front side member, or at a position on the inner side in the vehicle width direction of the inner edge in the vehicle width direction of the front end side of the front side member. An outer edge in the vehicle width direction of the rear end of the first crash box may be provided at a same position in the vehicle width direction as an outer edge in the vehicle width direction of a front end of the side extension part, or at a position on the outer side in the vehicle width direction of the outer edge in the vehicle width direction of the front end of the side extension part.

In the above configuration, a collision load input into the crash box in a frontal collision is appropriately transmitted toward the vehicle rear side.

The above vehicle front structure may further include a radiator disposed at a position on the vehicle front side of the cross member as well as on the vehicle rear side of and at a distance from the first bumper reinforcement.

The above configuration allows the crash box to undergo a predetermined amount of compressive deformation in a minor collision, without the bumper reinforcement coming into contact with the radiator depending on the separation distance between the bumper reinforcement and the radiator in the vehicle front-rear direction.

The above vehicle front structure may further include a pipe coupling together the radiator and a water-cooling condenser that is disposed on the vehicle rear side of the cross member. The pipe may extend along the vehicle front-rear direction through the vehicle upper side of the cross member as seen in a vehicle side view.

In the above configuration, the pipe can be easily installed by disposing the pipe after disposing the radiator in the vehicle body front part.

As described above, the vehicle front structure of the present disclosure has an excellent advantage of being able to improve the crashworthiness of an electric vehicle in a frontal collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle front structure according to an embodiment of the present disclosure will be described using FIG. 1 to FIG. 5B. The arrows FR, UP, W, and OUT shown as needed in these drawings indicate a vehicle front side, a vehicle upper side, a vehicle width direction, and an outer side in the vehicle width direction, respectively. An electric vehicle is adopted as the vehicle of this embodiment.

Figure 1:
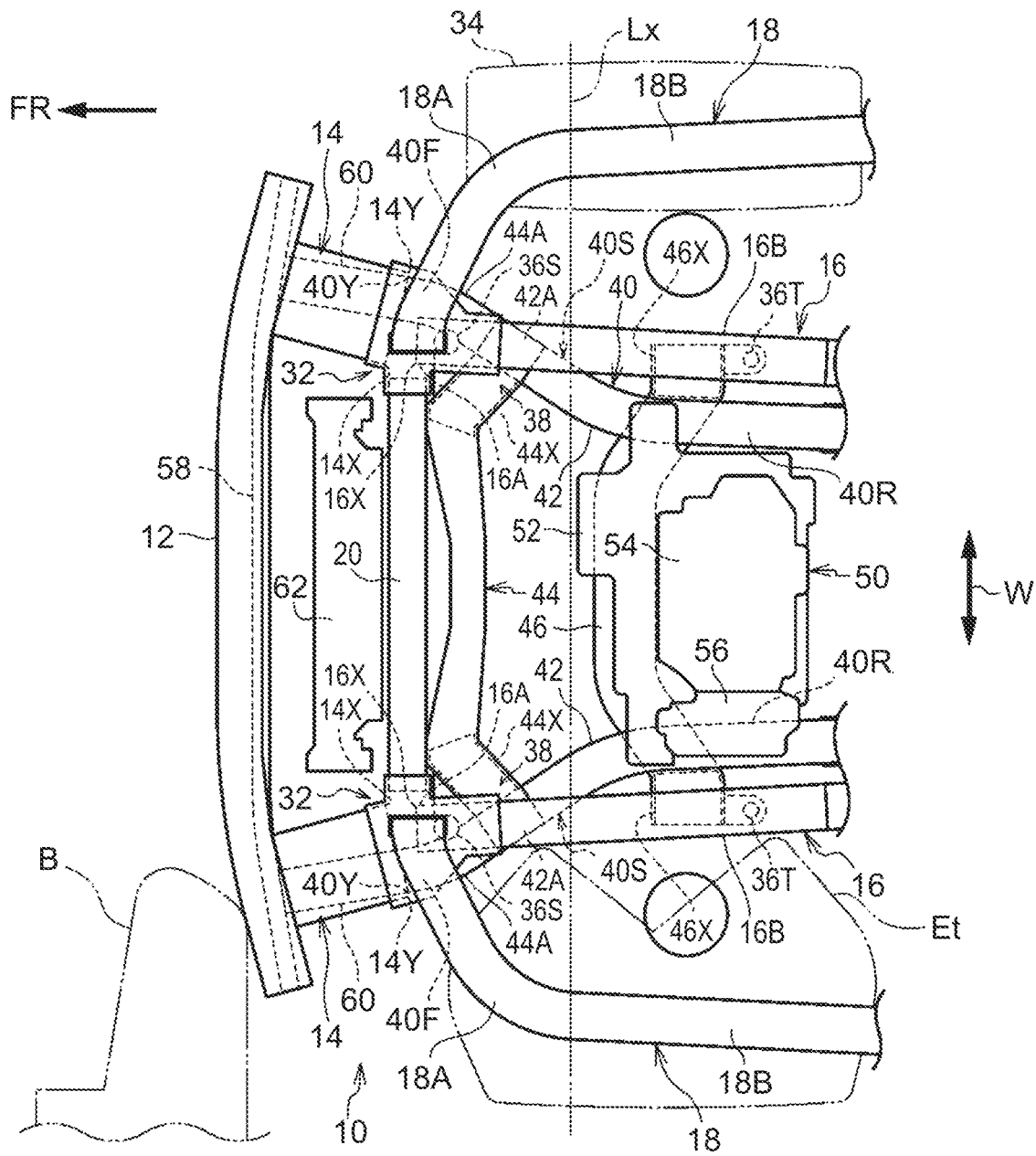
FIG. 1 is a plan view showing a vehicle front structure according to an embodiment of the present disclosure.
Figure 2:
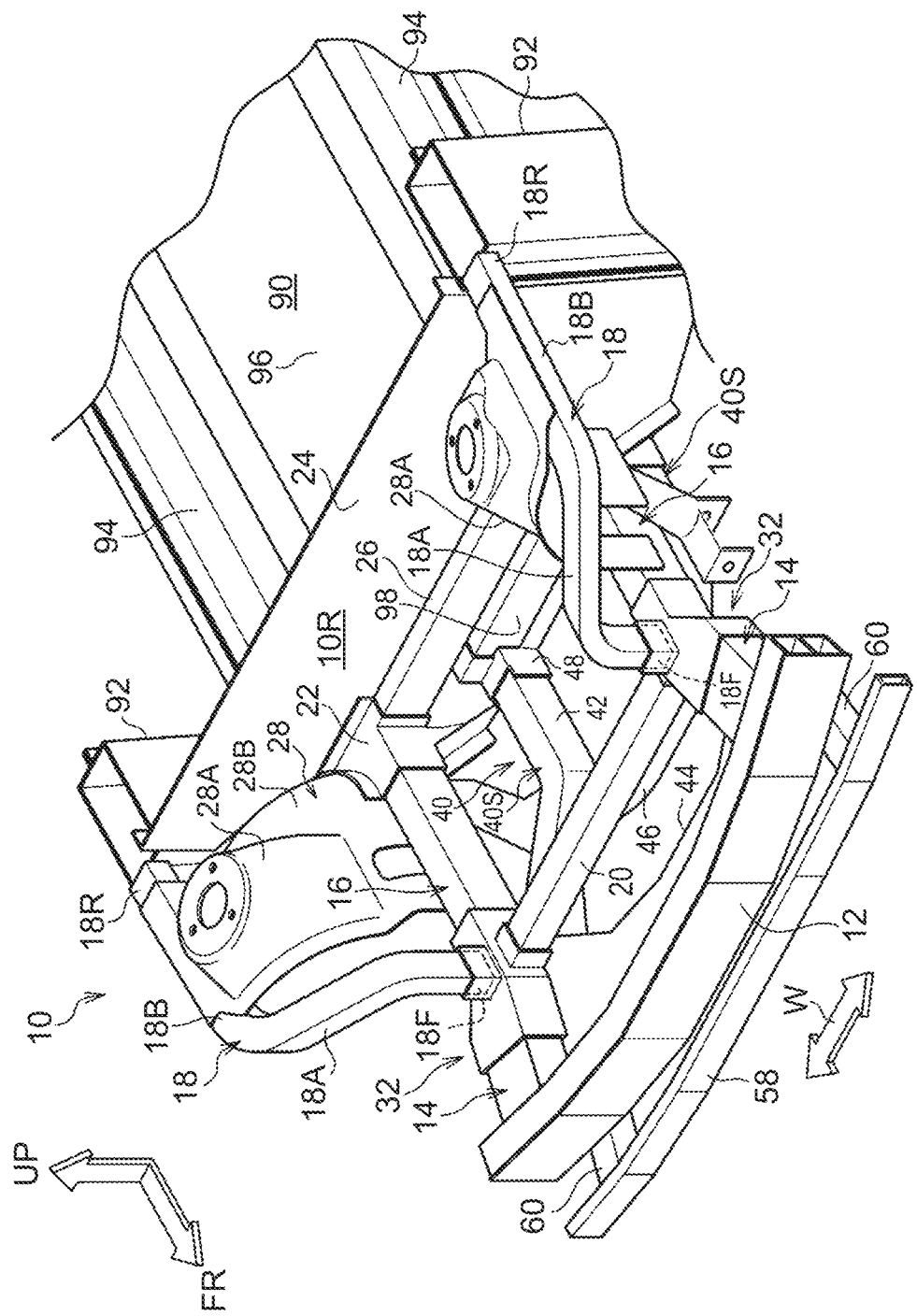
FIG. 2 is a perspective view showing the framework of the vehicle front structure of FIG. 1.

FIG. 1 shows the vehicle front structure according to this embodiment in a plan view, and FIG. 2 shows the framework of the vehicle front structure in a perspective view. As shown in FIG. 1 and FIG. 2, on a front-end side of a vehicle body front part 10, a first bumper reinforcement 12 (hereinafter abbreviated as the "first bumper RF 12") as a bumper reinforcement is disposed with a longitudinal direction oriented in the vehicle width direction. The first bumper RF 12 has a closed sectional structure extending in the longitudinal direction.

On both sides of the vehicle body front part 10 in the vehicle width direction, a pair of right and left front side members 16 are respectively disposed on a vehicle rear side of outer portions of the first bumper RF 12 in the vehicle width direction. The pair of right and left front side members 16 are provided symmetrically on right and left sides in the vehicle body front part 10, and incline outward in the vehicle width direction while extending along a vehicle front-rear direction toward the vehicle front side. The front side member 16 is placed such that a longitudinal direction is inclined as much as possible relative to the vehicle front-rear direction as seen in a vehicle plan view, to such an extent that the front side member 16 does not interfere with a tire envelope Et (see the left side of the vehicle in FIG. 1) of a front wheel 34 (see the right side of the vehicle in FIG. 1) and a motor 52 etc. to be described later. The front side member 16 has a closed sectional structure having a substantially rectangular cross-section orthogonal to the longitudinal direction.

As shown in FIG. 2, a rear end of the front side member 16 is joined to a front part of a front side rear member 22, and the front side rear member 22 is joined to a dashboard panel (a front wall of a vehicle body cabin) 24. The dashboard panel 24 demarcates a motor compartment (also referred to as a "power unit compartment") 10R and a cabin 90 located on the vehicle rear side of the motor compartment 10R, and outer ends of the dashboard panel 24 in the vehicle width direction are respectively joined to front pillars 92. A rear part (not shown) of the front side rear member 22 is joined to a rocker 94 that is disposed on each side of a lower end of the cabin 90. A dashboard cross member 26 is joined at an intermediate part in a vehicle height direction of a front surface of the dashboard panel 24, and the dashboard cross member 26 extends along the vehicle width direction. The front side rear members 22 are respectively joined to both ends of the dashboard cross member 26 in a longitudinal direction.

On the outer side in the vehicle width direction as well as the vehicle upper side of the front side member 16, a rear part 18B of the apron upper member 18 extends along the vehicle front-rear direction. The apron upper member 18 has an elongated shape, and a front part 18A of the apron upper member 18 extends toward a vehicle lower side while being bent toward an inner side in the vehicle width direction. Like the front side members 16, a pair of right and left apron upper members 18 are provided. A front lower end 18F of the apron upper member 18 is connected to the side of the front end 16A (see FIG. 3A and FIG. 3B) of the front side member 16, while a rear end 18R of the apron upper member 18 is joined to the front pillar 92. A panel 28 that has a suspension tower 28A and constitutes a part of a wheel house rear part 28B is suspended between the front side member 16 and the rear part 18B of the apron upper member 18. The front side rear member 22 is joined to a rear end of the wheel house rear part 28B on the inner side in the vehicle width direction.

A first crash box 14 as a crash box is interposed between the first bumper RF 12 and the front side member 16. The first crash box 14 inclines outward in the vehicle width direction while extending along the vehicle front-rear direction toward the vehicle front side. In this embodiment, as seen in the vehicle plan view shown in FIG. 1, the inclination of an extension direction of the first crash box 14 relative to the vehicle front-rear direction is set to be larger than the inclination of an extension direction of the front side member 16 relative to the vehicle front-rear direction. An inner edge 14X in the vehicle width direction of a rear end of the first crash box 14 is set at the same position in the vehicle width direction as an inner edge 16X in the vehicle width direction of the front end of the front side member 16.

The first crash box 14 has a closed sectional structure having a substantially rectangular cross-section orthogonal to a longitudinal direction. The first crash box 14 has a larger width outward in the vehicle width direction than the front end 16A of the front side member 16, so as to overlap a barrier (colliding body) B as seen from the vehicle front-rear direction in a small overlap collision of the vehicle. A small overlap collision of a vehicle refers to a type of frontal collisions of a vehicle in which, for example, as specified by IIHS, the amount of overlap with a colliding body in the vehicle width direction is not larger than 25%. The first crash box 14 is configured to undergo compressive deformation in an axial direction when a load equal to or larger than a predetermined value is input from the first bumper RF 12.

A cross member 20 is disposed between the front ends 16A of the pair of right and left front side members 16, with a longitudinal direction oriented in the vehicle width direction. The cross member 20 couples together the front ends 16A of the pair of right and left front side members 16 in the vehicle width direction, along with a portion of each gusset 32 that is a coupling member to be described later. The cross member 20 has a closed sectional structure having a substantially rectangular cross-section orthogonal to the longitudinal direction.

Figure 3A:
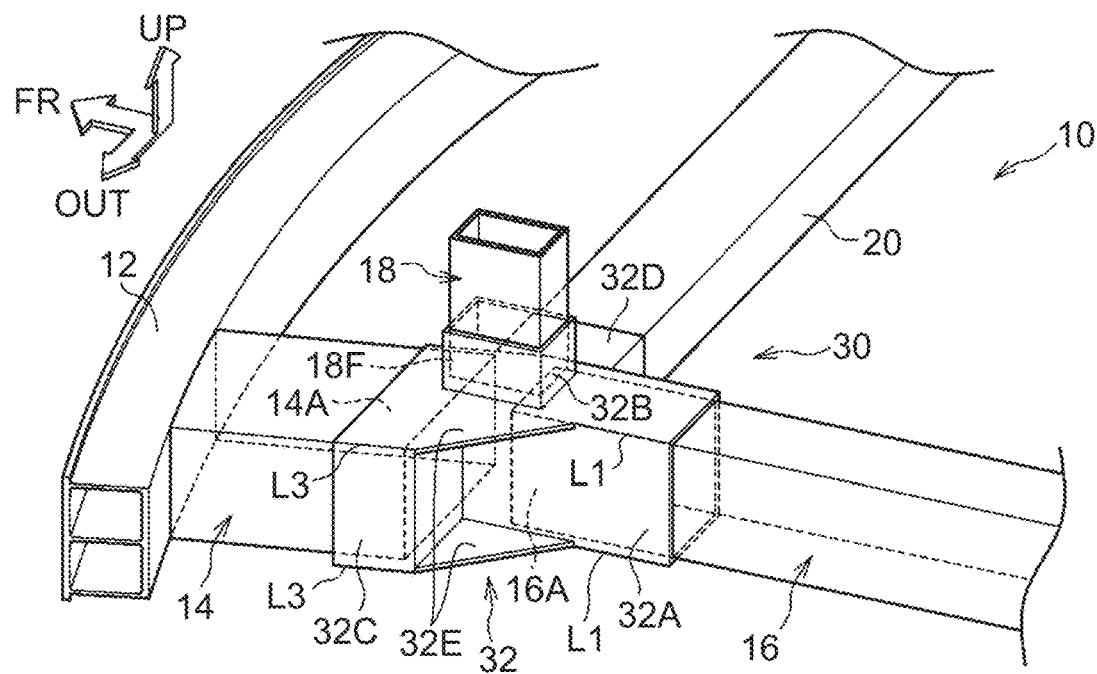
FIG. 3A is a perspective view showing a coupling part of a front side member, an apron upper member, a crash box, and a cross member of FIG. 1, and a part surrounding the coupling part (as seen from an outer side in a vehicle width direction as well as an obliquely upper rear side)
Figure 3B:
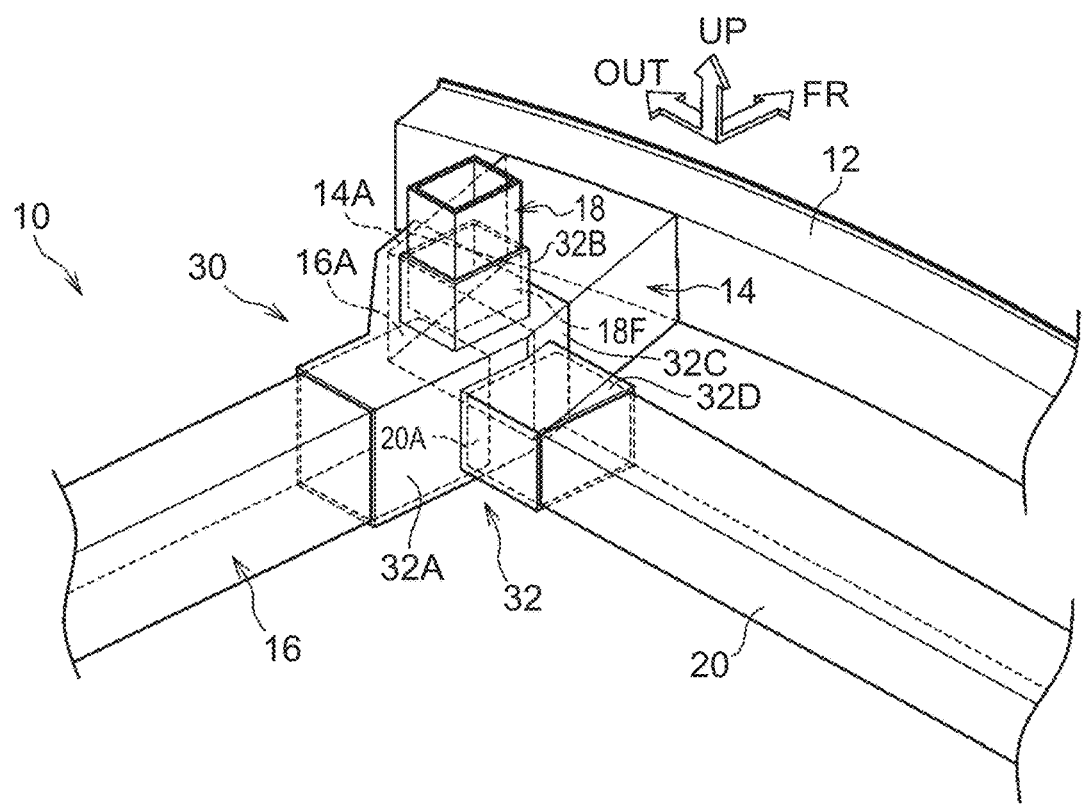
FIG. 3B is a perspective view showing the coupling part of the front side member, the apron upper member, the crash box, and the cross member of FIG. 1, and the part surrounding the coupling part (as seen from an inner side in the vehicle width direction as well as an obliquely upper rear side)

FIG. 3A and FIG. 3B show a coupling part 30 of the front side member 16, the apron upper member 18, the first crash box 14, and the cross member 20, and a part surrounding the coupling part 30 in perspective views. FIG. 3A shows a state as seen from the outer side in the vehicle width direction as well as an obliquely upper rear side, and FIG. 3B shows a state as seen from the inner side in the vehicle width direction as well as an obliquely upper rear side. As shown in FIG. 3A and FIG. 3B, the gusset 32 that couples together the front side member 16, the apron upper member 18, the first crash box 14, and the cross member 20 is disposed at the coupling part 30.

The gusset 32 includes a first tubular part 32A opening toward the vehicle rear side, a second tubular part 32B opening toward the vehicle upper side, a third tubular part 32C opening toward the vehicle front side, and a fourth tubular part 32D opening toward the inner side in the vehicle width direction. The first tubular part 32A, the second tubular part 32B, the third tubular part 32C, and the fourth tubular part 32D each have a rectangular tubular shape and are integrally formed.

The front end 16A of the front side member 16 is joined to the first tubular part 32A in an inserted state. The front lower end 18F of the apron upper member 18 is joined to the second tubular part 32B in an inserted state. A rear end 14A of the first crash box 14 is joined to the third tubular part 32C in an inserted state. An outer end 20A of the cross member 20 in the vehicle width direction is joined to the fourth tubular part 32D in an inserted state. For example, welding (e.g., so-called flow drill screw, or FDS®) can be used to join together the gusset 32 and the mating parts.

As shown in FIG. 3A, upper and lower ends of a front portion of the first tubular part 32A on the outer side in the vehicle width direction, and upper and lower ends of a rear end of the third tubular part 32C on the outer side in the vehicle width direction, are respectively coupled together by coupling plates 32E having a triangular shape as seen in a plan view. The triangular coupling plate 32E connects to each other an edge line L3 of the third tubular part 32C on the outer side in the vehicle width direction and an edge line L1 of the first tubular part 32A on the outer side in the vehicle width direction.

As shown in FIG. 1, a body mount 36S used to mount a front-side part of the suspension member 40 is fixed to a lower surface of the front end 16A of the front side member 16. A body mount 36T used to mount a rear-side part of the suspension member 40 is fixed to a lower surface of a rear part 16B of the front side member 16. Thus, as shown in FIG. 2, the suspension member 40 is supported in a state of being hung from the pair of right and left front side members 16.

As shown in FIG. 1, the suspension member 40 includes side rails 42 that are disposed as a pair on the right and left sides in the vehicle width direction, and a front cross member 44 and a rear cross member 46 that are disposed as a pair on the front and rear sides in the vehicle front-rear direction. The pair of right and left side rails 42 incline outward in the vehicle width direction while extending along the vehicle front-rear direction toward the vehicle front side as seen in a vehicle plan view, and at the same time curve toward the inner side in the vehicle width direction as well as to obliquely front side so as to protrude. As seen in a vehicle plan view, the inclination of an extension direction of a front part of the side rail 42 relative to the vehicle front-rear direction is larger than the inclination of an extension direction of a rear part of the side rail 42 relative to the vehicle front-rear direction. The front cross member 44 and the rear cross member 46 couple together the pair of right and left side rails 42 in the vehicle width direction. The front cross member 44 is disposed on the vehicle front side of the rear cross member 46.

A lower arm mounting portion 44X on which a suspension lower arm (not shown) is mounted is provided at a portion on each side of the front cross member 44, on the inner side of the side rail 42 in the vehicle width direction. A lower arm mounting portion 46X on which the suspension lower arm (not shown) is mounted is provided at a portion on each side of the rear cross member 46, on the outer side of the side rail 42 in the vehicle width direction.

In this embodiment, an outer portion of the front cross member 44 in the vehicle width direction is fixed to a front end 42A of the side rail 42 and extends so as to bend toward the vehicle front side. Thus, a front part 44A of the front cross member 44 on an outer end side in the vehicle width direction is disposed on the vehicle front side of the front end 42A of the side rail 42. Specifically, in the suspension member 40, a pair of right and left side extension parts 40S are formed that each include a portion of the front cross member 44 on the outer end side in the vehicle width direction and the side rail 42, and that extend along the vehicle front-rear direction. Each of the pair of right and left side extension parts 40S of the suspension member 40 has a front end 40F located on the outer side of the front side member 16 in the vehicle width direction and a rear-side portion 40R located on the inner side of the front side member 16 in the vehicle width direction. An outer edge 14Y in the vehicle width direction of the rear end of the first crash box 14 is set at a position slightly on the outer side in the vehicle width direction of an outer edge 40Y in the vehicle width direction of a front end of the side extension part 40S of the suspension member 40.

As shown in FIG. 2, a coupling member 48 is fixed to a rear end of the side rail 42. The coupling member 48 is mounted on a front end of a battery unit (battery pack) 98 that is disposed on the vehicle rear side of the coupling member 48. The battery unit 98 is installed on the lower side of a vehicle floor 96.

High-voltage components including the motor 52, a power control unit (PCU) 54, and an air-conditioning (AC) compressor 56 (hereinafter abbreviated as a "high-voltage component group 50") are installed on the suspension member 40 shown in FIG. 1. A steering gear box (not shown) is disposed on the front side of the motor 52, and the steering gear box is mounted on the suspension member 40. The front-side lower arm mounting portion 44X provided in the suspension member 40 is placed on the front side of the steering gear box. The rear-side lower arm mounting portion 46X provided in the suspension member 40 is placed on the rear side of the steering gear box.

The high-voltage component group 50 is disposed in the vehicle body front part 10, on the vehicle rear side of and at a distance from the cross member 20, and in this embodiment, is disposed on the vehicle rear side of each intersection 38 between the side extension part 40S of the suspension member 40 and the front side member 16 as seen in a vehicle plan view. To give further details, the high-voltage component group 50 is placed in such a region that the components are not crushed in a head-on collision (in this embodiment, for example, a region of the vehicle body front part 10 on the vehicle rear side from a long dashed double-short dashed line Lx of FIG. 1). In other words, the amount of energy required to be absorbed in a head-on collision is absorbed as the framework structure on the vehicle front side from the region where the high-voltage component group 50 is disposed deforms.

As shown in FIG. 1 and FIG. 2, a second bumper reinforcement 58 (hereinafter abbreviated as the "second bumper RF 58") is disposed on the vehicle lower side of the first bumper RF 12, with a longitudinal direction oriented in the vehicle width direction. The second bumper RF 58 has a closed sectional structure extending in the longitudinal direction.

As shown in FIG. 1, a second crash box 60 is interposed between the side extension part 40S of the suspension member 40 and the second bumper RF 58. The second crash box 60 is disposed on the vehicle lower side of the first crash box 14, and is placed so as to incline outward in the vehicle width direction while extending along the vehicle front-rear direction toward the vehicle front side, and so as to overlap the entire first crash box 14 as seen in a vehicle plan view. The second crash box 60 has a closed sectional structure, and is configured to undergo compressive deformation in an axial direction when a load equal to or larger than a predetermined value is input from the second bumper RF 58.

A radiator 62 having a thin, substantially rectangular parallelepiped shape is disposed at a position on the vehicle front side of the cross member 20 as well as on the vehicle rear side of and at a distance from the first bumper RF 12. The radiator 62 is used to cool a coolant, extends along the vehicle width direction and the vehicle height direction, and is supported on the vehicle body through a radiator support (not shown). The radiator 62 is placed at a limit position on the vehicle body front side, within such a range that the radiator 62 does not get damaged in a minor collision (as in a damageability test etc.).

Figure 4:
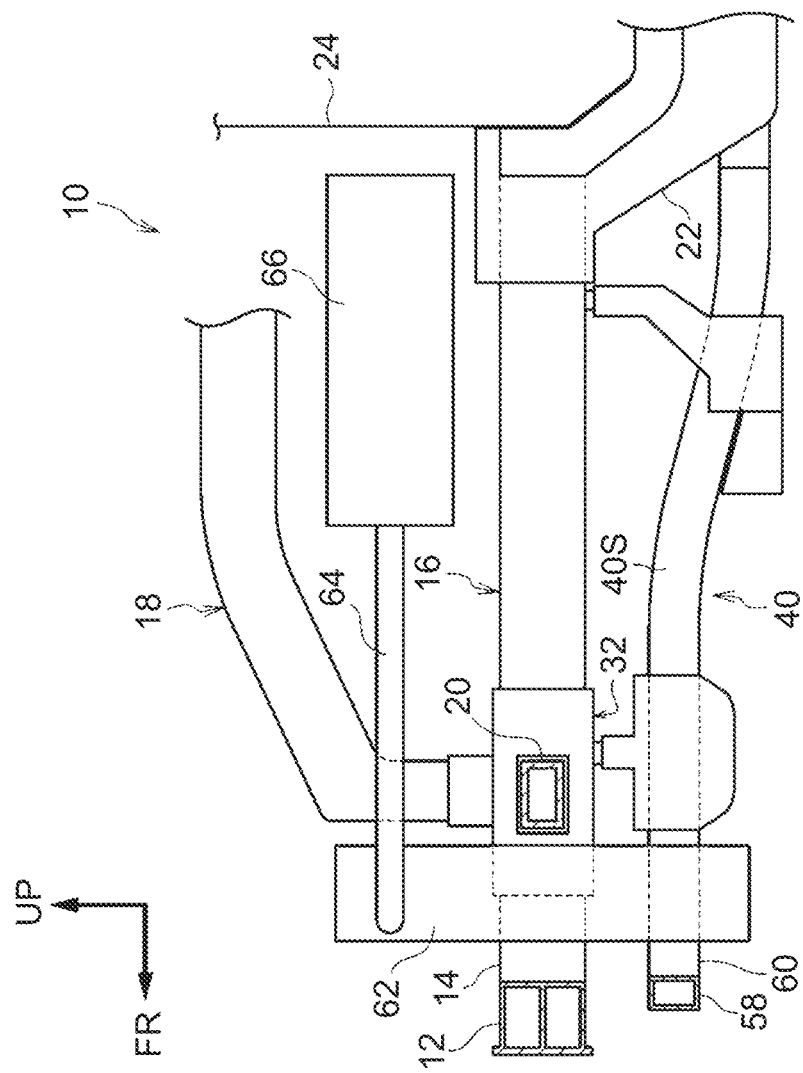
FIG. 4 is a side view showing the vehicle front structure, which is simplified to illustrate a pipe of a radiator etc. of FIG. 1.

FIG. 4 shows the vehicle front structure in a simplified side view to illustrate a pipe 64 of the radiator 62 etc. As shown in FIG. 4, a water-cooling condenser 66 (not shown in FIG. 1) is disposed on the vehicle rear side of the cross member 20. The water-cooling condenser 66 is installed on the vehicle upper side of the motor 52 (see FIG. 1) and supported on the vehicle body through a support member (not shown), and dissipates the heat of a cooling medium having been compressed by the AC compressor 56 (see FIG. 1). The water-cooling condenser 66 and the radiator 62 are coupled together by the pipe 64 (not shown in FIG. 1) through which the coolant flows. The pipe 64 extends along the vehicle front-rear direction through the vehicle upper side of the cross member 20 as seen in a vehicle side view.

In this embodiment, the first bumper RF 12, the first crash box 14, the pair of right and left front side members 16, the apron upper member 18, the cross member 20, the front side rear member 22, the dashboard cross member 26, the suspension member 40, the coupling member 48, the second bumper RF 58, and the second crash box 60 described above and shown in FIG. 1, FIG. 2, etc. are made of metal (e.g., aluminum alloy).

Next, the workings and effects of the above embodiment will be described.

As shown in FIG. 1, the pair of right and left front side members 16 incline outward in the vehicle width direction while extending toward the vehicle front side, and the first crash box 14 is interposed between the front side member 16 and the first bumper RF 12. Thus, when a collision load is input from a barrier B into an end in the vehicle width direction of the first bumper RF 12, this collision load is transmitted to the front side member 16 through the first crash box 14. The first crash box 14 undergoes compressive deformation in the process, thereby absorbing a predetermined amount of energy. Since the front lower end 18F (see FIG. 2) of the apron upper member 18 is connected to the side of the front end 16A of the front side member 16, part of the collision load transmitted from the first bumper RF 12 to the front side member 16 through the first crash box 14 is transmitted to the apron upper member 18.

Figure 5A:
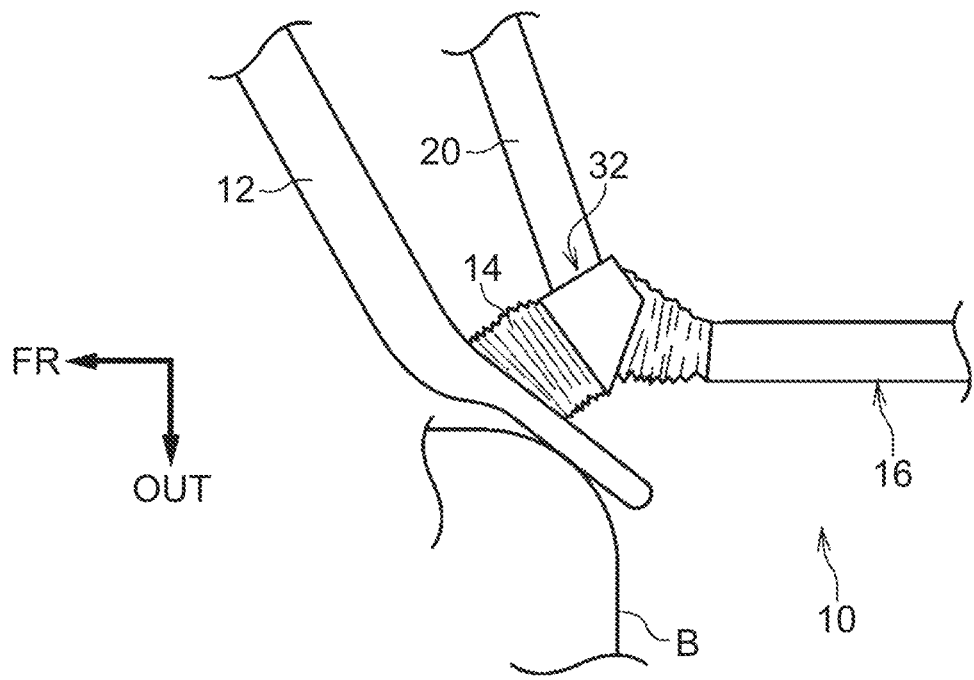
FIG. 5A is a schematic view, as seen from above, showing a state where a vehicle employing the vehicle front structure of FIG. 1 undergoes a small overlap collision with a barrier.

Here, the front ends 16A of the pair of right and left front side members 16 are coupled together in the vehicle width direction by the cross member 20. Thus, when a collision load is input into an end in the vehicle width direction of the first bumper RF 12 and transmitted to the front side member 16 through the first crash box 14, the cross member 20 acting as a strut restrains the bending of the front side member 16 as shown in FIG. 5A that is a schematic view as seen from above. As a result, the front side member 16 stably undergoes axial compressive deformation and efficiently absorbs energy.

Here, the workings and effects of the cross member 20 provided at the above-described position will be given an additional description.

Figure 5B:
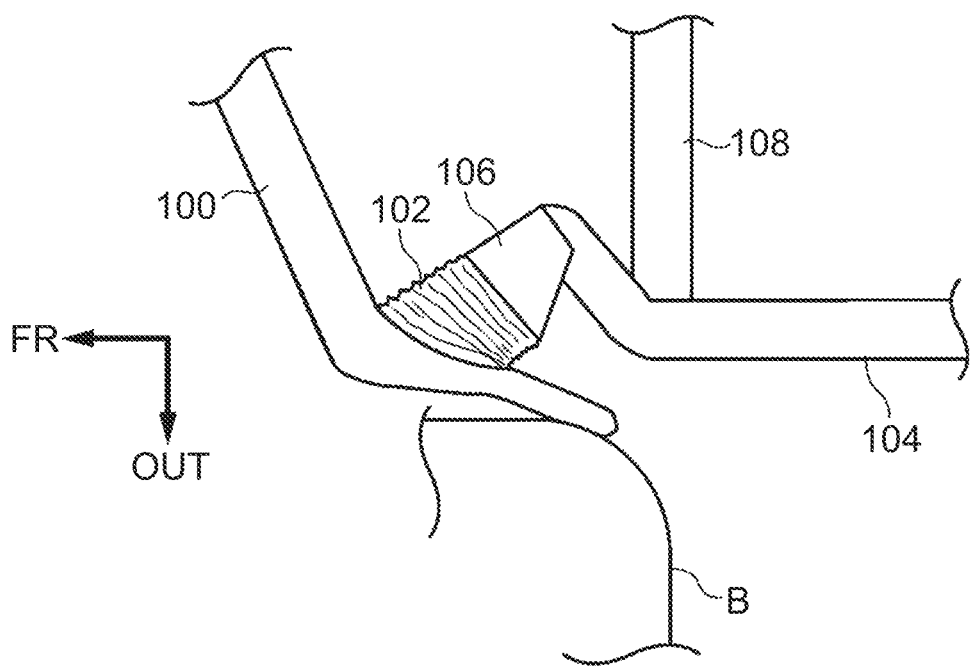
FIG. 5B is a schematic view, as seen from above, showing a state where a vehicle employing a vehicle front structure according to a comparative example undergoes a small overlap collision with a barrier.

FIG. 5B shows a schematic view, as seen from above, of a state where a vehicle employing a vehicle front structure according to a comparative example undergoes a small overlap collision with a barrier B. In this comparative example, a cross member 108 that couples together a pair of right and left front side members 104 in the vehicle width direction is provided at a position on the vehicle rear side of and at a distance from a gusset 106 that is provided at a coupling part of a front side member 104 and a crash box 102.

When the vehicle employing the vehicle front structure according to this comparative example undergoes a small overlap collision and a collision load is input from the barrier B into a bumper reinforcement 100, the force of the cross member 108 acting as a strut does not work effectively between the pair of right and left front side members 104 at an early stage of the collision. If the force of the cross member 108 acting as a strut does not work effectively at an early stage of a collision, the barrier B moves through the vehicle on the outer side in the vehicle width direction of the crash box 102 and the front side member 104, or completely crushes the crash box 102, and then bends a portion of the front side member 104 on the front side of the cross member 108 as well as on the rear side of the gusset 106 so as to fall inward in the vehicle width direction. The front side member 104 being thus bent is disadvantageous in absorbing the required amount of energy. A vehicle that cannot absorb a sufficient amount of energy by the vehicle body front part requires reinforcement of a cabin (not shown). As a result, the mass of the entire vehicle increases.

By contrast, when the vehicle employing the vehicle front structure according to the embodiment shown in FIG. 5A undergoes a small overlap collision with a barrier B, the force of the cross member 20 acting as a strut works effectively between the pair of right and left front side members 16 at an early stage of the collision. Thus, the front side member 16 is less likely to bend. As a result, in a small overlap collision, the front side member 16 can stably undergo axial compressive deformation, and therefore the vehicle body front part 10 can absorb an amount of energy larger than that in the comparative example. Accordingly, the mass required to reinforce the cabin 90 (see FIG. 2) can be reduced, and thereby the mass of the entire vehicle can be reduced.

It is in practice extremely difficult to place a member corresponding to the cross member 20 of the embodiment in a vehicle having only an engine as a driving source (so-called conventional vehicle), because large-size components, including the engine, are disposed in the vehicle body front part of the vehicle. In the case of an electric vehicle as in this embodiment, however, the size of components disposed in the vehicle body front part 10 is smaller than that in a so-called conventional vehicle. Thus, having greater freedom in terms of the framework than a so-called conventional vehicle, an electric vehicle allows the cross member 20 to be placed therein.

Moreover, as shown in FIG. 1, the high-voltage component group 50 is disposed on the vehicle rear side of and at a distance from the cross member 20. Thus, in a frontal collision of the vehicle, the front side member 16 can undergo axial compressive deformation without the cross member 20 coming into contact with the high-voltage component group 50 depending on the separation distance, and can thereby reduce the load on the dashboard panel. Frontal collisions include a head-on collision, an offset collision, and a small-overlap collision.

In this embodiment, the first crash box 14 has a larger width outward in the vehicle width direction than the front end 16A of the front side member 16. This allows for a large amount of overlap between the barrier B and the first crash box 14 in the vehicle width direction when the barrier B collides with the vehicle in a direction from the vehicle front side toward an end in the vehicle width direction of the first bumper RF 12. Thus, the first crash box 14 and the front side member 16 can undergo compressive deformation more appropriately in a small overlap collision of the vehicle.

This embodiment includes the suspension member 40 on which the high-voltage component group 50 is installed. Each of the side extension parts 40S of the suspension member 40 extends along the vehicle front-rear direction, and has the front end 40F located on the outer side of the front side member 16 in the vehicle width direction and the rear-side portion 40R located on the inner side of the front side member 16 in the vehicle width direction. This makes it easy to place the suspension member 40 so as not to interfere with the tire envelope Et.

In this embodiment, the second bumper RF 58 is disposed on the vehicle lower side of the first bumper RF 12, and the second crash box 60 is interposed between the side extension part 40S of the suspension member 40 and the second bumper RF 58, on the vehicle lower side of the first crash box 14. Thus, when a collision load is input into an end in the vehicle width direction of the second bumper RF 58, this collision load is transmitted to the side extension part 40S of the suspension member 40 through the second crash box 60. The second crash box 60 undergoes compressive deformation in the process, thereby absorbing a predetermined amount of energy. This means that in a small overlap collision, a predetermined energy can be absorbed by the second crash box 60 in addition to the first crash box 14.

In this embodiment, the high-voltage component group 50 is disposed on the vehicle rear side of each intersection 38 between the side extension part 40S of the suspension member 40 and the front side member 16 as seen in a vehicle plan view. Thus, when a small overlap collision occurs, the first crash box 14 and the second crash box 60 can undergo compressive deformation, and moreover the front side member 16 can undergo a predetermined amount of compressive deformation without the barrier B receiving a reaction force from the high-voltage component group 50.

In this embodiment, the second crash box 60 is placed so as to overlap the entire first crash box 14 as seen in a vehicle plan view. Thus, when a small overlap collision occurs, the second crash box 60 more stably absorbs energy in conjunction with the first crash box 14.

In this embodiment, the front side member 16, the apron upper member 18, the first crash box 14, and the cross member 20 are firmly coupled together through the gusset 32. Thus, when a collision load is transmitted from the first bumper RF 12 to the front side member 16 through the first crash box 14, the bending of the front side member 16 is appropriately restrained and part of the collision load is appropriately transmitted to the apron upper member 18.

In this embodiment, the inner edge 14X in the vehicle width direction of the rear end of the first crash box 14 is set at the same position in the vehicle width direction as the inner edge 16X in the vehicle width direction of the front end of the front side member 16. The outer edge 14Y in the vehicle width direction of the rear end of the first crash box 14 is set at a position on the outer side in the vehicle width direction of the outer edge 40Y in the vehicle width direction of the front end of the side extension part 40S of the suspension member 40. Thus, a collision load input into the first crash box 14 in a frontal collision is appropriately transmitted toward the vehicle rear side.

In this embodiment, the radiator 62 is disposed at a position on the vehicle front side of the cross member 20 as well as on the vehicle rear side of and at a distance from the first bumper RF 12, and is thus placed such that the first bumper RF 12 does not come into contact with the radiator 62 in a minor collision. Thus, in a minor collision, the first crash box 14 can undergo compressive deformation without the first bumper RF 12 coming into contact with the radiator 62. This can eliminate the need for replacing the radiator 62 even when the vehicle undergoes a minor collision.

As described above, the vehicle front structure of this embodiment can improve the crashworthiness of an electric vehicle in a frontal collision.

In this embodiment, as shown in FIG. 4, the pipe 64 coupling together the radiator 62 and the water-cooling condenser 66 that is disposed on the vehicle rear side of the cross member 20 extends along the vehicle front-rear direction through the vehicle upper side of the cross member 20 as seen in a vehicle side view. Thus, the pipe 64 can be easily installed by disposing the pipe 64 after disposing the radiator 62 in the vehicle body front part 10.

As a modified example of the above embodiment shown in FIG. 1 to FIG. 5B, a configuration can be adopted in which the inner edge in the vehicle width direction of the rear end of the first crash box 14 is placed at a position on the inner side in the vehicle width direction of the inner edge 16X in the vehicle width direction of the front end of the front side member 16.

As a modified example of the above embodiment, a configuration can be adopted in which the outer edge in the vehicle width direction of the rear end of the first crash box 14 is set at the same position in the vehicle width direction as the outer edge 40Y in the vehicle width direction of the front end of the side extension part 40S of the suspension member 40.

In the above embodiment, the first crash box 14 has a larger width outward in the vehicle width direction than the front end 16A of the front side member 16. As a modified example, the width of the crash box in the direction orthogonal to the axis may be set, for example, to be equal to the width of the front end of the front side member 16 as seen in a vehicle plan view.

As a modified example of the above embodiment, a configuration can be adopted in which, as seen in a vehicle plan view, the inclination of the extension direction of the first crash box 14 relative to the vehicle front-rear direction is equivalent to the inclination of the extension direction of the front side member 16 relative to the vehicle front-rear direction.

As a modified example of the above embodiment, a configuration can be adopted in which the front ends of the side extension parts that constitute the right and left sides of the suspension member and extend along the vehicle front-rear direction are placed at positions at which these front ends overlap the front side members, or at positions on the inner side of the front side members in the vehicle width direction.

In the above embodiment, the vehicle body front part 10 includes the second bumper RF 58 and the second crash box 60. As a modified example, a configuration can be adopted in which the vehicle body front part does not include the second bumper RF 58 and the second crash box 60. As another modified example, a configuration can be adopted in which the side extension part 40S of the suspension member 40 extends toward the vehicle front side and is joined to the second bumper RF 58, without the second crash box 60 being interposed between the side extension part and the second bumper RF.

In the above embodiment, the second crash box 60 is placed so as to overlap the entire first crash box 14 as seen in a vehicle plan view. As a modified example, the second crash box may be placed so as to overlap part of the first crash box as seen in a vehicle plan view.

In the above embodiment, the gusset 32 as a coupling member having the first tubular part 32A, the second tubular part 32B, the third tubular part 32C, and the fourth tubular part 32D is provided. As a modified example, a configuration can be adopted in which a member other than the gusset 32 is used to couple together the front side member, the apron upper member, the crash box, and the cross member.

As a modified example of the above embodiment, a configuration can be adopted in which the radiator 62 is disposed on the vehicle rear side of the cross member 20.

As a modified example of the above embodiment, the pipe coupling together the water-cooling condenser 66 that is disposed on the vehicle rear side of the cross member 20 and the radiator 62 that is disposed on the vehicle front side of the cross member 20 may include a U-shaped portion that passes under the vehicle lower side of the cross member 20 as seen in a vehicle side view.

The above-described embodiment and modified examples can be implemented in combination as appropriate.

While one example of the present disclosure is described above, it should be understood that the disclosure is not limited to this example but can be implemented with various modifications made thereto within the scope of the gist of the disclosure.

What is claimed is:

1. A vehicle front structure comprising:
    a first bumper reinforcement disposed on a front-end side of a vehicle body front part, with a longitudinal direction oriented in a vehicle width direction;
    a pair of right and left front side members respectively disposed on a vehicle rear side of outer portions of the first bumper reinforcement in the vehicle width direction, the pair of right and left front side members being provided so as to incline outward in the vehicle width direction while extending toward a vehicle front side;
    an apron upper member having an elongated shape of which a rear part is located on an outer side in the vehicle width direction as well as a vehicle upper side of the front side member and extends along a vehicle front-rear direction, a front lower end of the apron upper member being connected to a front end side of the front side member;
    a first crash box interposed between the first bumper reinforcement and the front side member, the first crash box being configured to undergo compressive deformation when a load equal to or larger than a predetermined value is input from the first bumper reinforcement;
    a cross member coupling together front ends of the pair of right and left front side members in the vehicle width direction; and
    a high-voltage component disposed on the vehicle rear side of and at a distance from the cross member, wherein
    the cross member is connected to a lateral side of the front end of each of the front side members.

2. The vehicle front structure according to claim 1, wherein
    the first crash box has a larger width outward in the vehicle width direction than the front end of the front side member.

3. A vehicle front structure, comprising:
    a first bumper reinforcement disposed on a front-end side of a vehicle body front part, with a longitudinal direction oriented in a vehicle width direction;
    a pair of right and left front side members respectively disposed on a vehicle rear side of outer portions of the first bumper reinforcement in the vehicle width direction, the pair of right and left front side members being provided so as to incline outward in the vehicle width direction while extending toward a vehicle front side;
    an apron upper member having an elongated shape of which a rear part is located on an outer side in the vehicle width direction as well as a vehicle upper side of the front side member and extends along a vehicle front-rear direction, a front lower end of the apron upper member being connected to a front end side of the front side member;
    a first crash box interposed between the first bumper reinforcement and the front side member, the first crash box being configured to undergo compressive deformation when a load equal to or larger than a predetermined value is input from the first bumper reinforcement;
    a cross member coupling together front ends of the pair of right and left front side members in the vehicle width direction;
    a high-voltage component disposed on the vehicle rear side of and at a distance from the cross member; and
    a suspension member on which the high-voltage component is installed and which includes a pair of right and left side extension parts extending along the vehicle front-rear direction, wherein
    each of the pair of right and left side extension parts has a front end located on the outer side of the front side member in the vehicle width direction and a rear-side portion located on an inner side of the front side member in the vehicle width direction.

4. The vehicle front structure according to claim 3, further comprising:
    a second bumper reinforcement disposed on a vehicle lower side of the first bumper reinforcement, with a longitudinal direction oriented in the vehicle width direction; and
    a second crash box interposed between the side extension part and the second bumper reinforcement, on the vehicle lower side of the first crash box,
    wherein the second crash box is configured to undergo compressive deformation when a load equal to or larger than a predetermined value is input from the second bumper reinforcement, and
    wherein the high-voltage component is disposed on the vehicle rear side of an intersection between the side extension part and the front side member as seen in a vehicle plan view.

5. The vehicle front structure according to claim 4, wherein
    the second crash box is provided so as to overlap the entire first crash box as seen in the vehicle plan view.

6. A vehicle front structure, comprising:
    a first bumper reinforcement disposed on a front-end side of a vehicle body front part, with a longitudinal direction oriented in a vehicle width direction;
    a pair of right and left front side members respectively disposed on a vehicle rear side of outer portions of the first bumper reinforcement in the vehicle width direction, the pair of right and left front side members being provided so as to incline outward in the vehicle width direction while extending toward a vehicle front side;
    an apron upper member having an elongated shape of which a rear part is located on an outer side in the vehicle width direction as well as a vehicle upper side of the front side member and extends along a vehicle front-rear direction, a front lower end of the apron upper member being connected to a front end side of the front side member;

a first crash box interposed between the first bumper reinforcement and the front side member, the first crash box being configured to undergo compressive deformation when a load equal to or larger than a predetermined value is input from the first bumper reinforcement;

a cross member coupling together front ends of the pair of right and left front side members in the vehicle width direction;

a high-voltage component disposed on the vehicle rear side of and at a distance from the cross member; and a coupling member that couples together the front side member, the apron upper member, the first crash box, and the cross member, wherein the coupling member includes:
- a first tubular part that opens toward the vehicle rear side and is joined to the front side member, with the front end side of the front side member being inserted into the first tubular part;
- a second tubular part that opens toward the vehicle upper side and is joined to the apron upper member, with a front lower end side of the apron upper member being inserted into the second tubular part;
- a third tubular part that opens toward the vehicle front side and is joined to the first crash box, with a rear end side of the first crash box being inserted into the third tubular part; and
- a fourth tubular part that opens toward an inner side in the vehicle width direction and is joined to the cross member, with an outer end side of the cross member in the vehicle width direction being inserted into the fourth tubular part.

7. The vehicle front structure according to claim 3, wherein:

an inner edge in the vehicle width direction of a rear end of the first crash box is provided at a same position in the vehicle width direction as an inner edge in the vehicle width direction of the front end of the front side member, or at a position on the inner side in the vehicle width direction of the inner edge in the vehicle width direction of the front end of the front side member; and an outer edge in the vehicle width direction of the rear end of the first crash box is provided at a same position in the vehicle width direction as an outer edge in the vehicle width direction of a front end of the side extension part, or at a position on the outer side in the vehicle width direction of the outer edge in the vehicle width direction of the front end of the side extension part.

8. The vehicle front structure according to claim 1, further comprising a radiator disposed at a position on the vehicle front side of the cross member as well as on the vehicle rear side of and at a distance from the first bumper reinforcement.

9. The vehicle front structure according to claim 8, further comprising a pipe coupling together the radiator and a water-cooling condenser that is disposed on the vehicle rear side of the cross member, wherein the pipe extends along the vehicle front-rear direction through the vehicle upper side of the cross member as seen in a vehicle side view.

10. The vehicle front structure according to claim 3, further comprising a coupling member that couples together the front side member, the apron upper member, the first crash box, and the cross member, wherein:

the coupling member includes:
- a first tubular part that opens toward the vehicle rear side and is joined to the front side member, with the front end side of the front side member being inserted into the first tubular part;
- a second tubular part that opens toward the vehicle upper side and is joined to the apron upper member, with a front lower end side of the apron upper member being inserted into the second tubular part;
- a third tubular part that opens toward the vehicle front side and is joined to the first crash box, with a rear end side of the first crash box being inserted into the third tubular part; and
- a fourth tubular part that opens toward an inner side in the vehicle width direction and is joined to the cross member, with an outer end side of the cross member in the vehicle width direction being inserted into the fourth tubular part;

an inner edge in the vehicle width direction of the rear end of the first crash box is provided at a same position in the vehicle width direction as an inner edge in the vehicle width direction of the front end of the front side member, or at a position on the inner side in the vehicle width direction of the inner edge in the vehicle width direction of the front end of the front side member; and an outer edge in the vehicle width direction of the rear end of the first crash box is provided at a same position in the vehicle width direction as an outer edge in the vehicle width direction of a front end of the side extension part, or at a position on the outer side in the vehicle width direction of the outer edge in the vehicle width direction of the front end of the side extension part.

11. The vehicle front structure according to claim 1, wherein the apron upper member is connected to an upper side of the front end of the front side member.

12. The vehicle front structure according to claim 1, wherein an entirety of the apron upper member is above the front side member.

13. The vehicle front structure according to claim 1, wherein a portion the cross member is at a same level as a portion of each of the front side members in a vehicle height direction.

14. The vehicle front structure according to claim 1, wherein at least three of (1) the cross member or an imaginary extension thereof, (2) the front side member or an imaginary extension thereof, (3) the apron upper member or an imaginary extension thereof, and (4) the first crash box or an imaginary extension thereof, intersect each other at a common space.

* * * * *